(12) United States Patent
Yamasaki

(10) Patent No.: US 7,843,659 B2
(45) Date of Patent: Nov. 30, 2010

(54) HEAD IC, READ CIRCUIT, MEDIA STORAGE DEVICE AND AMPLIFIER GAIN ADJUSTMENT METHOD FOR HEAD IC

(75) Inventor: Nobuyoshi Yamasaki, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 157 days.

(21) Appl. No.: 12/199,244

(22) Filed: Aug. 27, 2008

(65) Prior Publication Data

US 2009/0147408 A1 Jun. 11, 2009

(30) Foreign Application Priority Data

Dec. 7, 2007 (JP) ............... 2007-317331

(51) Int. Cl.
*G11B 5/09* (2006.01)
*G11B 5/02* (2006.01)
(52) U.S. Cl. .......................... 360/46; 360/67
(58) Field of Classification Search ............... None
See application file for complete search history.

(56) References Cited

U.S. PATENT DOCUMENTS 5,955,921 A * 9/1999 Ide et al. .................. 330/254
6,018,554 A * 1/2000 Glover .................... 375/345
2008/0100944 A1* 5/2008 Matsui et al. ............. 360/46
2008/0123212 A1* 5/2008 Amemiya ................ 360/67

FOREIGN PATENT DOCUMENTS

JP B2 2624842 6/1997
JP A 10-21647 1/1998

* cited by examiner

*Primary Examiner*—Daniell L Negrón
*Assistant Examiner*—Regina N Holder
(74) *Attorney, Agent, or Firm*—Greer, Burns & Crain, Ltd.

(57) ABSTRACT

A head IC adjusts an amplitude level of a read signal of a head and outputs the adjusted signal to a read channel having an AGC amplifier. A head IC includes: a differential amplifier; an AGC circuit; external gain setting sections; and a switch. The AGC amplifier is disposed in the head IC, and the amplitude from the head is automatically adjusted in the head IC. The signal level can be adjusted within the input dynamic range of the AGC amplifier of the read channel. An estimated gain value converted from a result of measuring a resistance value of the head is used as an initial value for the adjustment of the AGC amplifier. It becomes possible attempting to prevent an increase in the lock-in times of the AGC, to guarantee stability, and to prevent judgment errors of the AGC.

4 Claims, 8 Drawing Sheets

HEAD IC, READ CIRCUIT, MEDIA STORAGE DEVICE AND AMPLIFIER GAIN ADJUSTMENT METHOD FOR HEAD IC

CROSS-REFERENCE TO RELATED APPLICATIONS

This application is based upon and claims the benefit of priority from the prior Japanese Patent Application No. 2007-317331, filed on Dec. 7, 2007, the entire contents of which are incorporated herein by reference.

BACKGROUND OF THE INVENTION

1. Field of the Invention

The present invention relates to a head IC, a read circuit, a media storage device and an amplifier gain adjustment method for a head IC which adjust output levels of read signals of an head, and more particularly to a head IC, read circuit, media storage device and amplifier gain adjustment method for a head IC which adjust the read signals of heads having different output levels to a predetermined level.

2. Description of the Related Art

In a media storage device, such as a magnetic disk device, a head reads data from media. Along with an increase in track density in recent years, heads having high sensitivity in detecting the magnetic flux on the media are being provided. For example, an MR (Magnetic Resistance) element is used for a read head. On the other hand, the use of a TuMR (or TMR) element, which utilizes the tunnel effect, is under consideration as an element having an even higher detection sensitivity.

Such a read element has high detection sensitivity, so manufacturing the elements having uniform characteristics is difficult. Hence the output level of an individual read element is not constant, and also changes depending on the characteristic change and fluctuation of the floating amount of the element due to temperature fluctuation. Therefore a circuit to adjust the output level of the read element is required before demodulating data.

FIG. 11 is a diagram depicting a configuration of a conventional media storage device, and FIG. 12 is a block diagram of a conventional read circuit. As FIG. 11 shows, magnetic heads 202a and 202b, to read data on a media (magnetic disk) 210, are disposed at the tip of an actuator 200.

The actuator 200 rotates around a rotation axis 204 and positions the magnetic heads 202a and 202b on a desired track of the magnetic disk 210. The magnetic heads 202a and 202b are connected to a head IC 220 provided on the actuator 200, and the head IC 220 is connected to a control circuit 230 outside the actuator 200.

Since the distances from the magnetic heads 202a and 202b to the control circuit 230 are long, the signal levels of the magnetic heads 202a and 202b may change, and noise may enter, so the head IC 220 is disposed between the magnetic heads 202a and 202b and the control circuit 230 and adjusts the signal level. This head IC 220 also plays a part of integrating many signal lines between the magnetic head and the control circuit to simplify wiring. For example, the control circuit 230 and the head IC 220 are connected via a serial interface (SI), and the head IC 220 and each magnetic head 202a and 202b are connected with individual signal lines.

FIG. 12 is a detailed diagram of a read system circuit in FIG. 11, where a variable gain amplifier (preamplifier) 220-1 is disposed in the head IC 220, which is connected to a read element 202-1 of the magnetic head 202a (or 202b), and amplifies the output of the read element 202 at a gain which is set. In the variable gain amplifier 220-1, the number of settings in the gain adjustment range is four, and gain is set and adjusted for each head before the device is shipped.

In the control circuit 230, which is connected to the head IC 220, a read channel 230-1 is disposed, and an AGC (Automatic Gain Control) amplifier 230-2, disposed in the read channel 230-1, receives output from the variable gain amplifier 220-1 of the head IC 220.

The AGC amplifier 230-2 is comprised of a differential amplifier 230-3 and an AGC circuit 230-4. The AGC circuit 230-4 compares an output value of the differential amplifier 230-3 and a reference output value, feeds back the comparison result to adjust the gain of the differential amplifier 230-3, and adjusts the output level of the differential amplifier 230-3 to the reference level (e.g. see Japanese Patent Application Laid-Open No. H10-021647 (FIG. 1 and others)).

The AGC circuit 230-4 sets a high-speed feedback coefficient (frequency, gain change amount) which follows up the change in one sector of a track of the magnetic disk 210, and equalizes the signal level within one sector.

In the prior art, the fluctuation of the output level caused by the characteristics of the element itself and the fluctuation, due to environmental conditions, including the floating amount change, are mainly adjusted by the AGC amplifier of the read channel.

However use of the TuMR element, which has a higher detection sensitivity than this read element, is desired, due to the recent increase in recording density. This read element having a high detection sensitivity is about 10 times that of an MR element, but dispersion of the individual signal output level is also high accordingly.

Also the fluctuation of the signal level, due to the fluctuation of temperature and floating amount, is also high because the detection sensitivity is high. And it may be difficult that the AGC amplifier in the read channel adjusts such major fluctuations of the signal level.

Also because of the increase in recording density, circuit frequency has increased, and a high-speed AGC amplifier of the read channel is also demanded. Such AGC amplifier has a narrower input dynamic range of the AGC. As a result, it is difficult to adjust the fluctuation of the level by changing the AGC amplifier of the read channel.

It could be possible to adjust the setting value of the variable gain amplifier, but adjusting the setting value of the variable gain amplifier is difficult since the number of steps are few, for example four. It could be possible to adjust the setting value of the variable gain amplifier by increasing the number of steps, but this spreads the distribution of the gain setting which is set initially, and adjustment before reading the system area of the disk takes time.

Also because increasing the number of steps requires considering relationships with the dynamic range of the AGC amplifier of the read channel, it is necessary to adjust even more time and to limit the adjustment of the level fluctuation.

SUMMARY OF THE INVENTION

With the foregoing in view, it is an object of the present invention to provide a head IC, read circuit, media storage device and amplifier gain adjustment method for a head IC, that automatically adjusts the dispersion of output of an individual head, even if the dispersion of output levels of the heads is major.

It is another object of the present invention to provide a head IC, read circuit, media storage device and amplifier gain adjustment method for a head IC for automatically adjusting the dispersion of output of an individual head, even if the input dynamic range of an AGC circuit of a read channel is narrow.

It is still another object of the present invention to provide a head IC, read circuit, media storage device and amplifier gain adjustment method for a head IC for decreasing the time required for adjusting the dispersion of output of an individual head, and automatically adjusting and stabilizing the output fluctuation of the head.

To achieve these objects, a head IC of the present invention is a head IC, which adjusts an amplitude level of a read signal of a head and outputs to a read channel which has an AGC amplifier, having: a differential amplifier for amplifying the read signal of the head by a gain which is set; a latch circuit for latching a gain of the differential amplifier; an AGC circuit that determines a difference between an amplitude level of the differential amplifier and a reference level, automatically adjusts a gain of the differential amplifier by a feedback loop, and updates the latch circuit; a resistance measurement circuit for measuring a resistance value of the head; and an interface circuit that sets an estimated gain value, which is converted from the measured resistance value of the head, in the latch circuit. And the AGC circuit is operated after the estimated gain value is set in the latch circuit.

A read circuit of the present invention has a head IC for adjusting an amplitude level of a read signal from the head, and a read channel that is connected to the head IC, and has an AGC amplifier. And the head IC has: a differential amplifier for amplifying a read signal of the head by a gain which is set; a latch circuit for latching a gain of the differential amplifier; an AGC circuit that determines a difference between an amplitude level of the differential amplifier and a reference level, automatically adjusts a gain of the differential amplifier by a feedback loop, and updates the latch circuit; a resistance measurement circuit for measuring a resistance value of the head; and an interface circuit that sets an estimated gain value, which is converted from the measured resistance value of the head, in the latch circuit. And the AGC circuit is operated after the estimated gain value is set in the latch circuit.

A media storage device has a head for reading information on a medium, a head IC for adjusting an amplitude level of a read signal from the head, a read channel that is connected to the head IC and has an AGC amplifier, and a control circuit for controlling the read operation of the head. And the head IC has: a differential amplifier for amplifying a read signal of the head by a gain which is set; a latch circuit for latching a gain of the differential amplifier; an AGC circuit that determines a difference between an amplitude level of the differential amplifier and a reference level, automatically adjusts a gain of the differential amplifier by a feedback loop, and updates the latch circuit; a resistance measurement circuit for measuring a resistance value of the head; and an interface circuit for transferring signals with the control circuit, and the control circuit sets an estimated gain value, which is converted from the measured resistance value of the head, measured by the resistance measurement circuit, in the latch circuit via the interface circuit. And the AGC circuit is operated after the estimated gain value is set in the latch circuit.

An amplifier gain adjustment method for a head IC of the present invention is an amplifier gain adjustment method for a head IC for adjusting an amplitude level of a read signal from a head that reads information on a medium, the method having steps of: measuring a resistance value of the head; converting an estimated gain value of an AGC amplifier of the head IC constituted by a differential amplifier and an AGC circuit from the resistance value; setting the estimated gain value in the AGC amplifier; and operating the AGC circuit after the estimated gain value is set.

In the present invention, it is preferable that the interface circuit reads a gain value obtained by operating the AGC circuit from the latch circuit, outputs the gain value to an external device using an AGC enable signal, and receives the initial value read from the external device, and sets the value in the latch circuit.

It is preferable that the present invention further has a switch for selectively connecting the AGC circuit and the interface circuit to the latch circuit.

In the present invention, it is preferable that the differential amplifier operates as an AGC amplifier using the AGC circuit when the AGC enable signal is ON, and operates as a fixed amplifier using a setting gain from the external device when the AGC enable signal is OFF.

It is preferable that the present invention further has a head selection circuit for selecting one of a plurality of the heads, wherein an estimated gain value corresponding to the selected head is set in the latch circuit.

It is preferable that the present invention further has a step of reading a gain value obtained by operating the AGC circuit and storing the value in a memory, and a step of setting the gain value of the memory in the AGC amplifier when read operation of the head starts.

In the present invention, it is preferable that the conversion step further has a step of estimating an output current of the head from the resistance value, and a step of calculating the estimated gain value from a target output value of the AGC amplifier, and the output current value.

Since the AGC amplifier is disposed in the head IC, the amplitude from the head is automatically adjusted in the head IC, and the signal level can be adjusted within the input dynamic range of the AGC amplifier of the read channel. Also an estimated gain value converted from a result of measuring a resistance value of the head is used as an initial value for the adjustment of the AGC amplifier, so it becomes possible attempting to prevent an increase in the lock-in times of the AGC, to guarantee stability of the AGC and to prevent judgment errors of the AGC.

DESCRIPTION OF THE PREFERRED EMBODIMENTS

Embodiments of the present invention will now be described in the sequence of a media storage device, a configuration of a read circuit, an operation of the read circuit and other embodiments, but the present invention is not limited to these embodiments.

(Media Storage Device)

Figure 1:
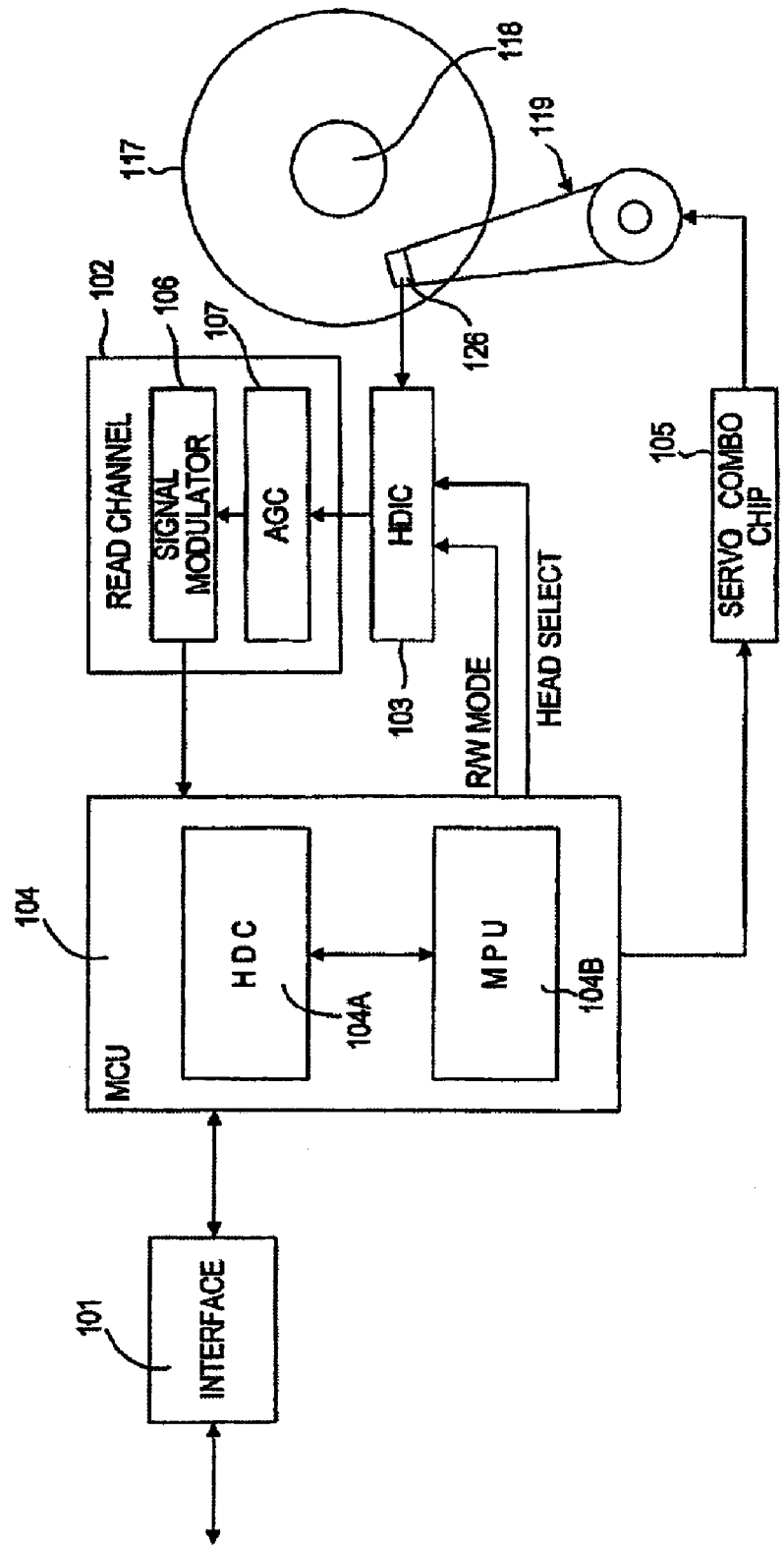
FIG. 1 is a diagram depicting a configuration of a media storage device according to an embodiment of the present invention.

FIG. 1 is a diagram depicting a configuration of a media storage device according to an embodiment of the present invention. FIG. 1 shows a magnetic disk device as the media storage device. As FIG. 1 shows, a magnetic disk 117, which is a magnetic storage media, is installed on a rotation axis 118 of a spindle motor. The spindle motor rotates the magnetic disk 117. An actuator (VCM) 119 has a magnetic head 126 at the tip, and moves the magnetic head 126 in the radius direction of the magnetic disk 117.

The actuator 119 is composed of a voice coil motor (VCM) which rotates around the rotation axis. If two magnetic disks 117 are installed on the magnetic disk device, four magnetic heads 126, for reading/writing each surface of magnetic disks, are simultaneously driven by the same actuator 119.

The magnetic head 126 is comprised of a read element and a write element. For example, the magnetic head 126 is constructed by layering a read element, including a tunnel effect magneto-resistance (TuMR) element, on a slider, and layering a write element, including a write coil, thereon.

Figure 11:
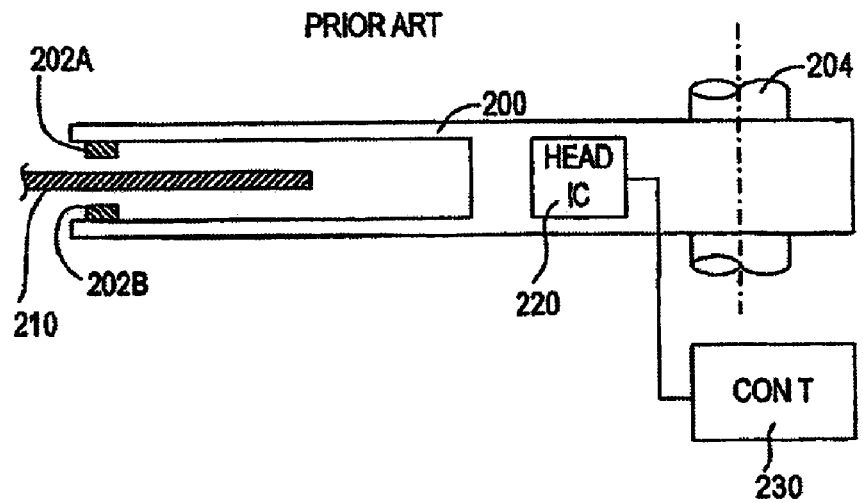
FIG. 11 is a diagram depicting a configuration of a conventional media storage device.
Figure 12:
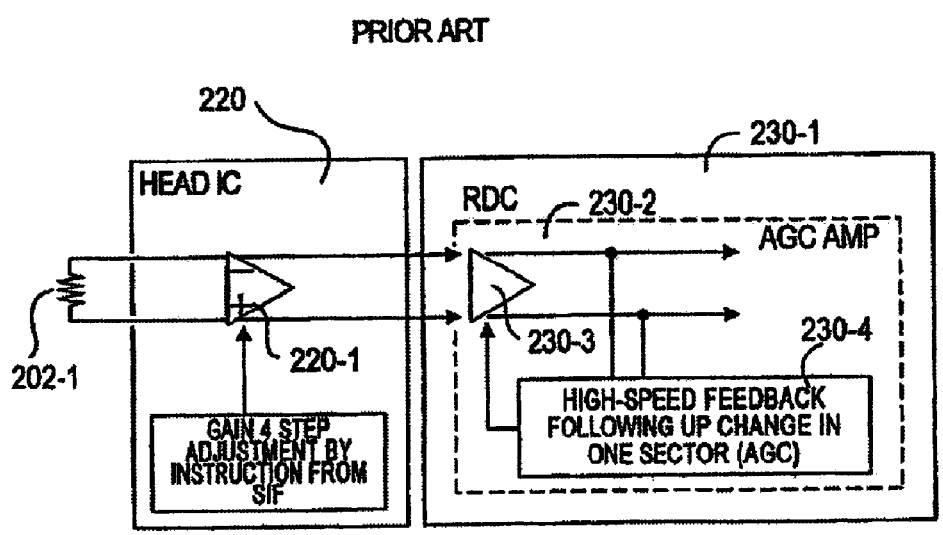
FIG. 12 is a block diagram of a conventional read circuit.

A head IC 103 is disposed on a side face of the actuator 119, as shown in FIG. 11, and is comprised of a read system circuit, including an AGC amplifier, and a write circuit, as described in FIG. 2 and later. The head IC 103 amplifies a read signal from the read element of the magnetic head 126 and outputs it in read mode, and supplies write drive current to the write element of the magnetic head 126 in write mode.

A read channel 102 has a read system circuit and a write systems circuit, and the read system circuit further has an AGC amplifier 107 and a signal demodulation circuit 106. A micro controller (MCU) 104 comprises a hard disk controller (HDC) 104a and a microprocessor (MPU) 104b.

The hard disk controller (HDC) 104a analyzes a command, judges a position in a track based on a sector number of a servo signal, controls recording/reproducing of data, and temporarily stores read data or write data. The MPU 104b controls each unit, and also detects (demodulates) a current position based on a servo position signal from the signal demodulation circuit 106, and computes a VCM drive command value for the actuator 119, according to an error between the detected current position and the target position.

A servo combo circuit 105 drives an actuator 119 (supplies drive current) using a VCM drive command value, and also drives the spindle motor. An interface circuit 101 communicates with a host using such an interface as USB (Universal Serial Bus), SATA (Serial AT Attached) or SCSI (Small Component System Interface).

Servo signals (position signals) are disposed on the magnetic disk 117 in a circumferential direction in each track from the outer circumference to the inner circumference of the disk 117. Each track is comprised of a plurality of sectors, and servo signals are recorded in each sector. A servo signal is comprised of a servo mark, a track number, index, offset information (servo burst) PosA, PosB, PosC and PosD.

This position signal is read by the head 126, and the position of the magnetic head in the radius direction is detected using the track number and the offset information PosA, PosB, PosC and PosD. Also based on the index signal Index, the position of the magnetic head in the circumference direction is detected.

In order to read these position signals and data, the level of the read output of the read element of the magnetic head 126 is adjusted by the head IC 103, and is adjusted to a predetermined level by the AGC circuit 107 of the read channel 102.

(Configuration of Read Circuit)

Figure 2:
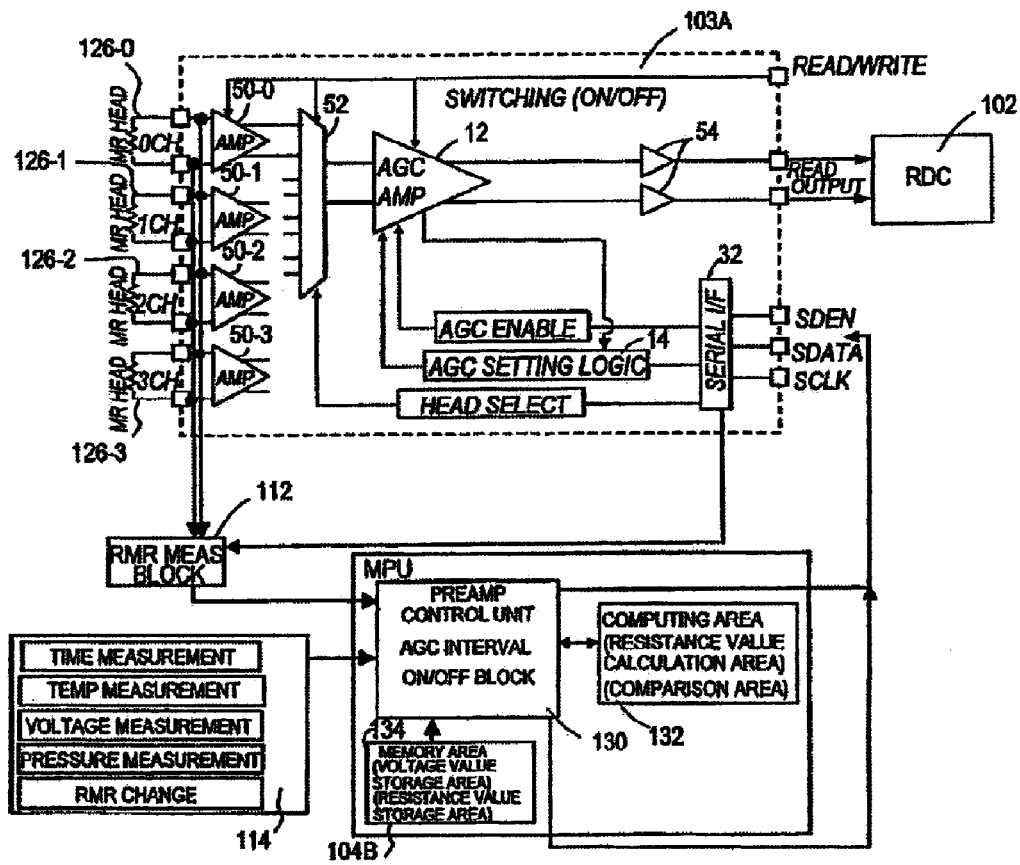
FIG. 2 is a circuit diagram depicting the first embodiment of the read circuit of the present invention.
Figure 3:
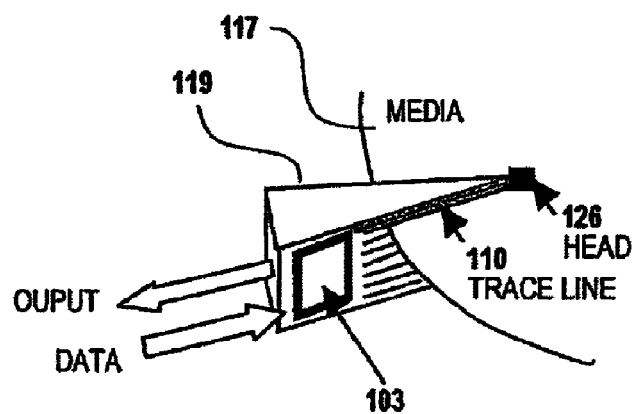
FIG. 3 is a diagram depicting a read circuit mounted in the configuration in FIG. 2.
Figure 4:
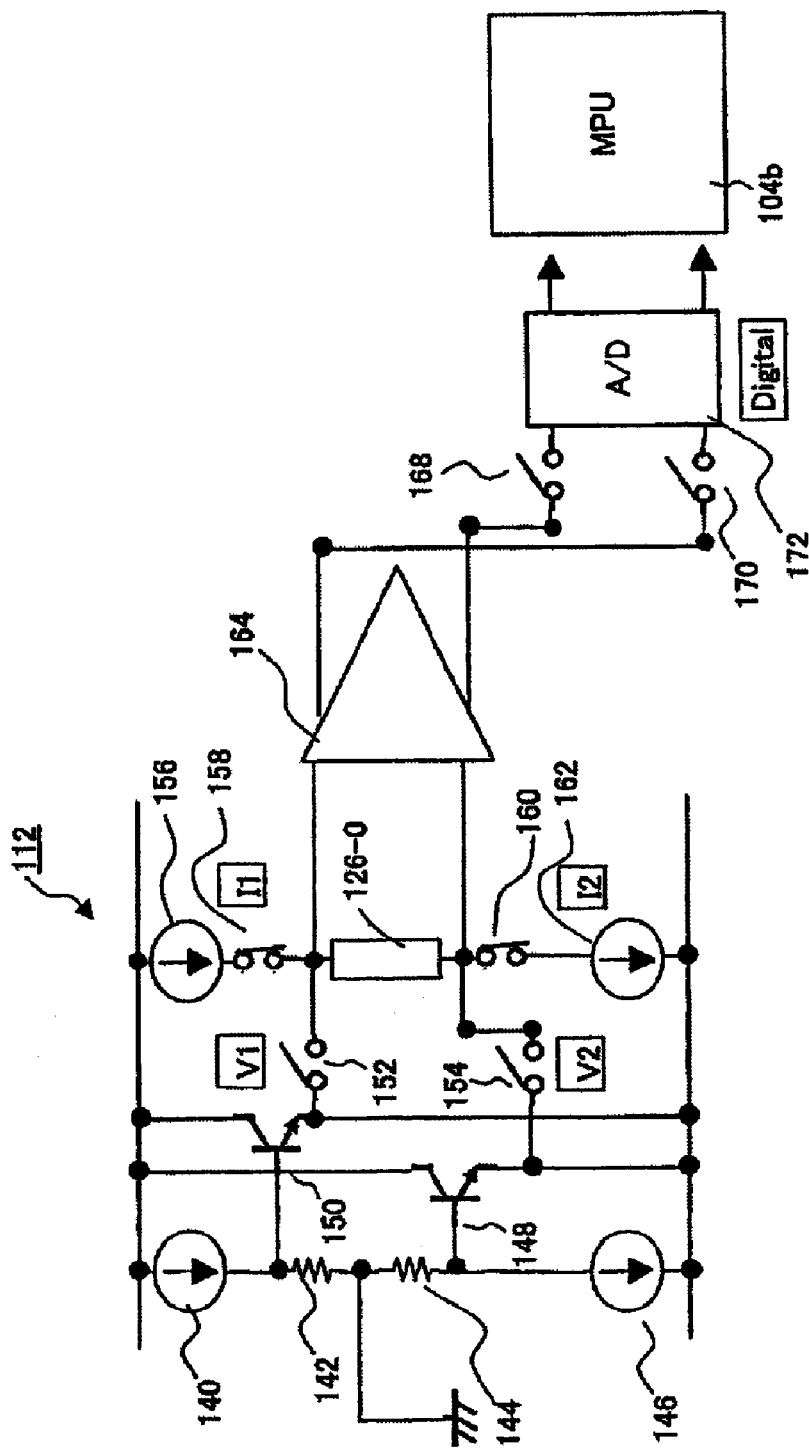
FIG. 4 is a circuit diagram depicting a gain adjustment circuit in FIG. 2.
Figure 5:
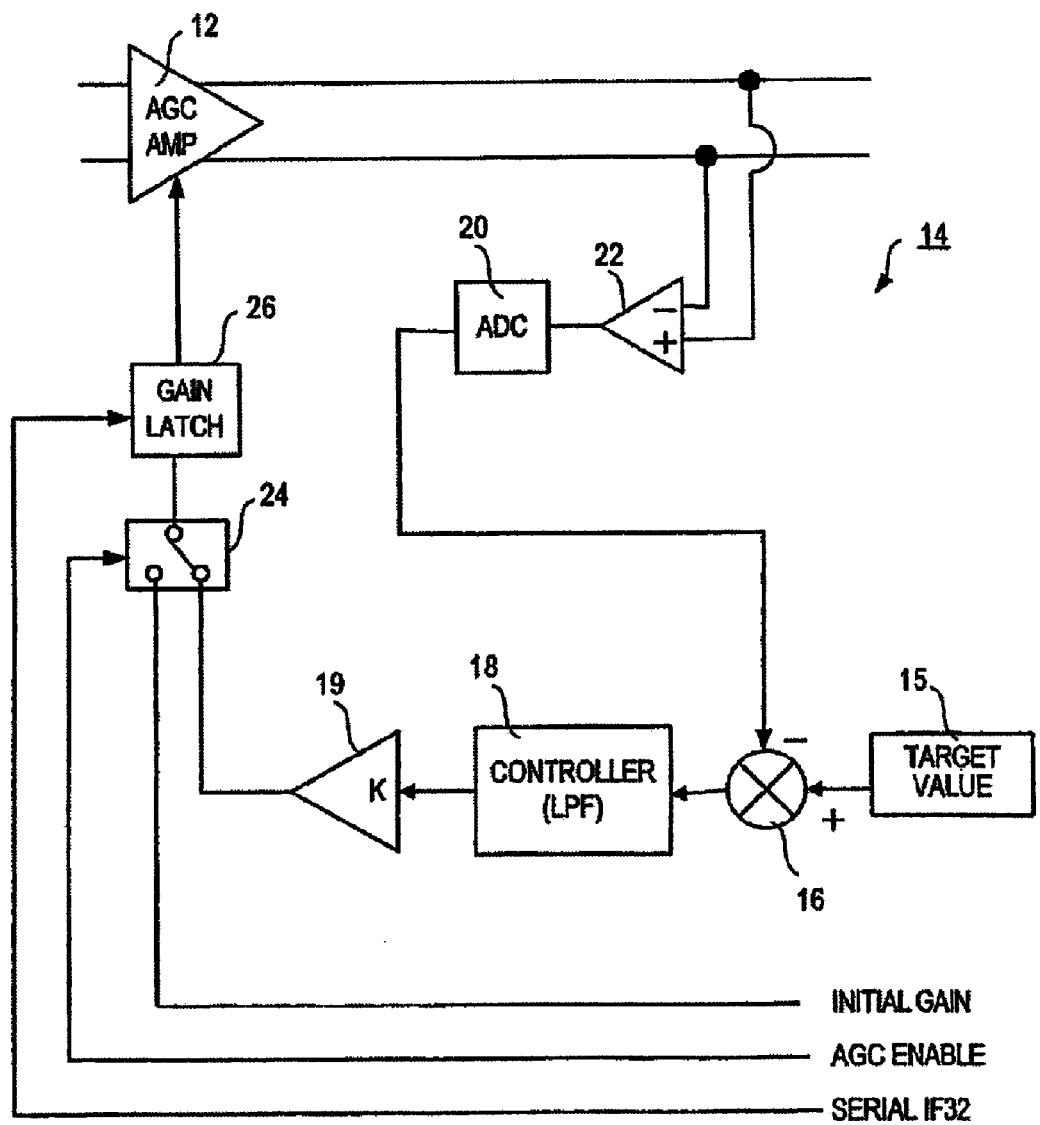
FIG. 5 is a circuit diagram depicting an AGC circuit mounted in the configuration in FIG. 2.

FIG. 2 is a circuit diagram depicting an embodiment of the read circuit of the present invention, FIG. 3 is a diagram depicting a head IC mounted in the configuration in FIG. 2, FIG. 4 is a circuit diagram depicting a resistance measurement circuit in FIG. 2, and FIG. 5 is a circuit diagram depicting a gain adjustment circuit in FIG. 2. In FIG. 2, composing elements the same as FIG. 1 are denoted with the same symbols, and four (four channels) of read elements (TuMR elements) 126-0 to 126-3 are connected to the head IC 103.

The head IC 103 has first differential amplifiers 50-0 to 50-3 for amplifying the outputs of each read elements 126-0 to 126-3, and a head selection circuit (multiplexer) 52 for selecting an output of one of the differential amplifiers 50-0 to 50-3 by a head selection signal.

The head IC 103 has a read circuit 103a and a resistance measurement circuit 112 which is mentioned in FIG. 4. The read circuit 103a has an AGC amplifier unit. This AGC amplifier has a differential amplifier 12, to which the terminal voltages of the read elements (TuMR elements) 126-0 to 126-3 are input via the multiplexer 52, and an AGC circuit 14 that compares an output value of the differential amplifier 12 and a reference value, and adjusts the gain of the differential amplifier 12.

The read circuit 103a of the head IC 103 also has a serial interface unit 32 that receives a serial data enable signal SDEN, serial data SDATA, and a serial clock SCLK from an MPU 104b via a read channel 102, and a buffer amplifier 54 that outputs the output of the differential amplifier 12 to an AGC amplifier 107 of the read channel 102.

The resistance measurement circuit 112 is connected to each read element 126-0 to 126-3, supplies measurement current (or measurement voltage) to each read element 126-0 to 126-3 using a measurement start instruction from the MPU 104b via the serial interface unit 32, and outputs the terminal voltages of the read elements 126-0 to 126-3 to the MPU 104b.

The MPU 104b has a computing unit 132, a memory 134 and a preamplifier (head IC) control unit 130, as a function. The memory 134 stores a measured voltage value of each read element, a resistance value calculated from the voltage value, and an initial gain value obtained from the resistance value.

The computing unit 132 calculates a resistance value from a measured voltage value, and calculates an initial gain value from a resistance value. The preamplifier control unit 130 is for controlling the AGC, and controls the ON/OFF of the AGC.

An environmental state measurement unit 114 is connected to the MPU 104b. The environmental state measurement unit 114 has a time measurement unit, temperature measurement unit, voltage measurement unit and pressure measurement unit, for example.

FIG. 3 is a diagram depicting an example of an installed state of the head IC 103, where the head IC 103 is installed at the root of an actuator 119 in which a magnetic head 126 is mounted. The head IC 103 is connected to the magnetic head 126 with a connection line (trace line) 110.

Now the resistance measurement circuit 112 is described with reference to FIG. 4. Here the read element (TuMR element) 126-0 is described as an example, but the same is also true for the other read elements.

In the current measurement mode, current sources for measurement (plus side and minus side) 156 and 162 are connected to both ends of the read element 126-0 via the switches 158 and 162 respectively. When the resistance is measured, both of the switches 158 and 162 are turned ON, and currents for measurements I1 and I2 are supplied to the read element 126-0 by the two current sources for measurements 156 and 162.

To enable the voltage measurement mode (that is to enable measurement by applying voltage) as well, a first transistor 150 is connected to one end of the read element 126-0 via a switch 152, and a second transistor 148 is connected to the other end of the read element 126-0 via a switch 154.

The base of the first transistor 150 is connected to a connection point between a first current source 140 and a grounded resistor 142, and supplies the voltage V1. The base of the second transistor 148 is connected to a connection point between a grounded resistor 144 and a second current source 146, and supplies the voltage V2.

When the resistance is measured, both of the switches 152 and 154 are turned ON, and the voltages for measurement V1 and V2 are applied to the read element 126-0 via the two transistors 150 and 148.

In the current measurement mode or voltage measurement mode, a current for measurement (DC current) is supplied to the read element 126-0. A preamplifier 164 amplifies the terminal voltages of the read element 126-0, and outputs the amplified voltages to an A/D (Analog/Digital) converter 172 via switches 168 and 170. The A/D converter 172 converts the terminal voltage difference of the read element 126-0 into a digital value, and outputs the result to the MPU 104b.

Therefore when a resistance measurement instruction is provided to the resistance measurement circuit 112, in current measurement mode, the switches 158, 160, 168 and 170 are turned ON, the DC current for measurement is supplied to the read element 126-0, and the MPU 104b receives the terminal voltage difference of the read element 126-0 as a digital value from the A/D converter 172.

In the voltage measurement mode, on the other hand, the switches 152, 154, 168 and 170 are turned ON, the DC voltage for measurement is applied to the read element 126-0, and the MPU 104b receives the terminal voltage difference of the read element 126-0 as a digital value from the A/D converter 172.

Now the AGC circuit 14 will be described with reference to FIG. 5. As FIG. 5 shows, the AGC circuit 14 has a differential signal converter 22 that determines a difference between a minus side voltage of the differential amplifier 12 and a plus side voltage of the differential amplifier 12, and extracts the amplitude, an ADC (Analog Digital converter) 20 that performs analog/digital conversion of an extracted amplitude, a memory 15 that stores a target amplitude value, a gain error detection circuit 16 that compares a digital amplitude value and a target value, a feedback controller (low pass filter) 18 and a gain multiplier 19.

The gain error detector 16 has a computing unit that computes the difference between the target amplitude value of the memory 15 and the amplitude detected by the ADC 20. This difference is the gain error.

The feedback controller 18 has a low pass filter, and cuts the high frequency components of the gain error signals and forms a loop, so as to follow up the low frequency gain error signals. The gain multiplier 19 determines an amplification factor by multiplying the output of the low pass filter 18 by K, which is a feedback gain, and controls the gain of the differential amplifier 12.

The AGC circuit 14 also has a gain latch circuit 26 for latching the gain of the differential amplifier 12, and a gain switch 24 for connecting the gain latch circuit 26 to either the output of the gain multiplier 19 or the initial gain from the serial interface unit 32 using the AGC enable signal from the serial interface unit 32.

Therefore in the AGC circuit 14, an initial gain is set in the gain latch circuit 26 by the gain switch 24 at initialization, and when the AGC enable signal is received, the gain switch 24 is connected to the gain multiplier 19, and an AGC sequencer, which is not illustrated, activates the AGC circuit 14 (blocks 22, 20, 16, 18 and 19).

Hence AGC control can be started with an initial gain value matching the characteristics of the read element, and time required to converge the gain of the AGC can be decreased considerably. This initial gain value is obtained from the measured resistance value of the read element, as mentioned later, so an initial gain value matching the output characteristics of the read element can be set.

(Operation of Read Circuit)

Figure 6:
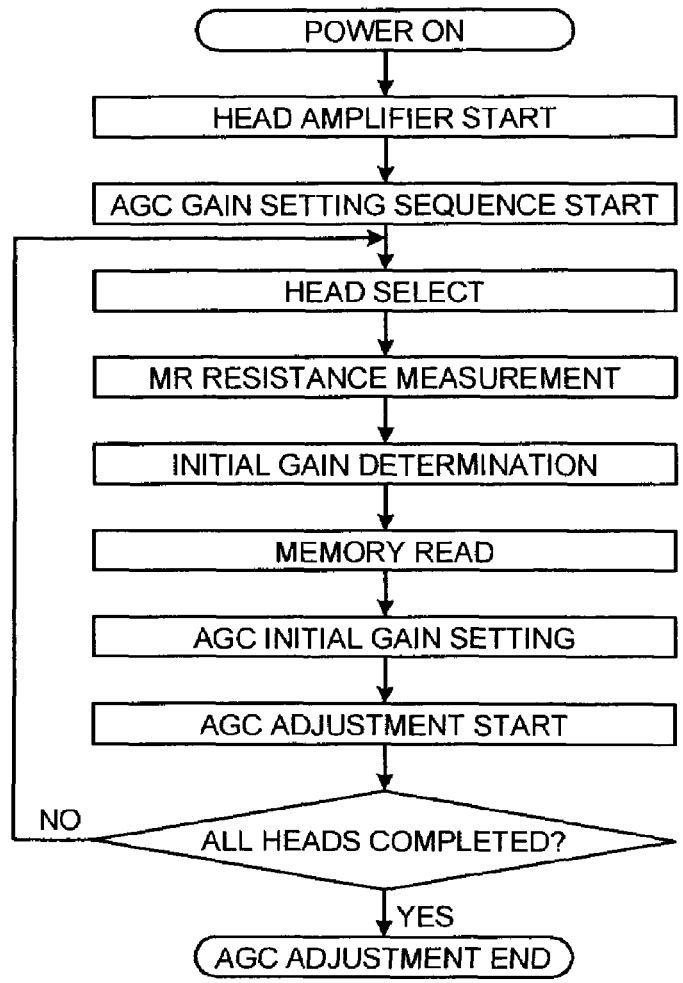
FIG. 6 is a flow chart depicting an embodiment of amplifier gain adjustment processing according to the present invention.
Figure 7:
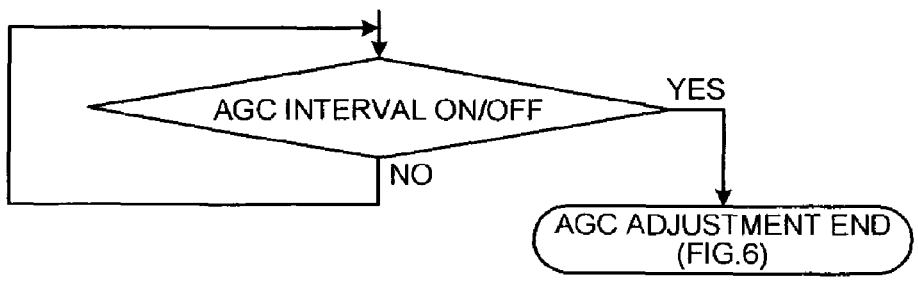
FIG. 7 is a flow chart depicting another embodiment of amplifier gain adjustment processing according to the present invention.
Figure 8:
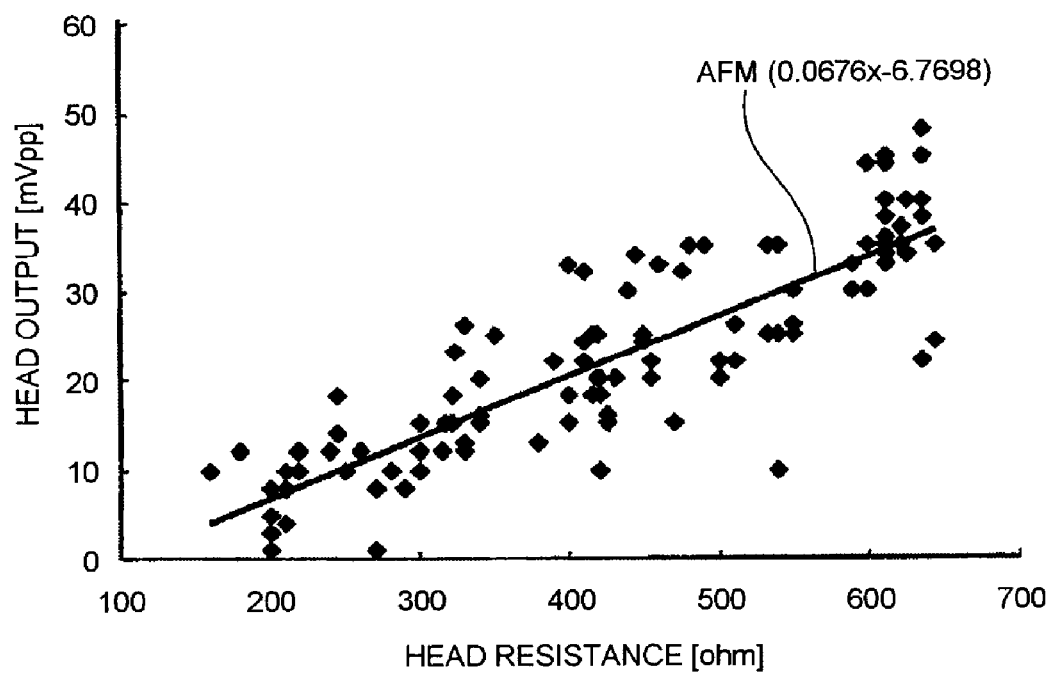
FIG. 8 is a graph depicting the relationship of the measured resistance values and the output current in FIG. 6.
Figure 9:
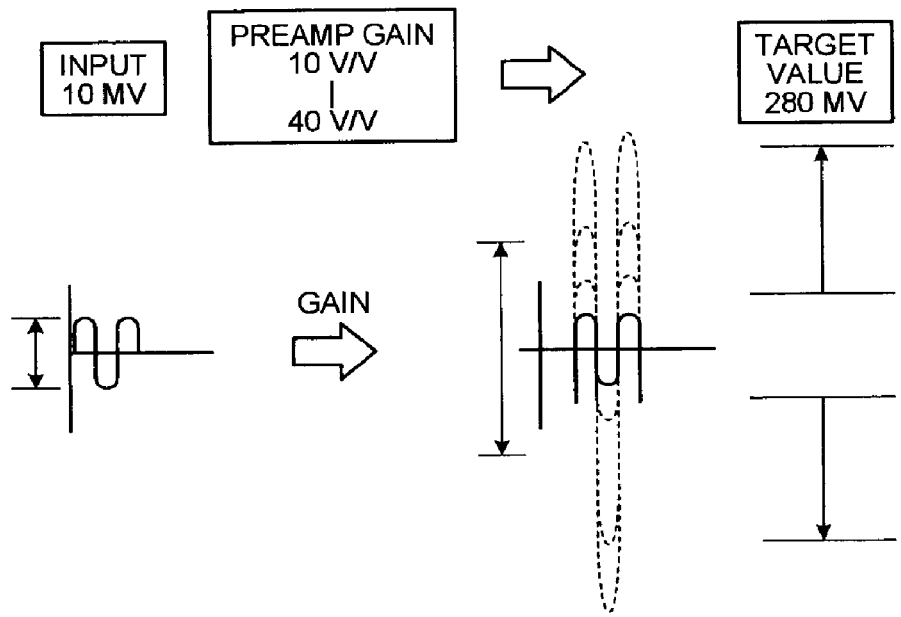
FIG. 9 shows an AGC operation when an initial value is not set as comparative example.
Figure 10:
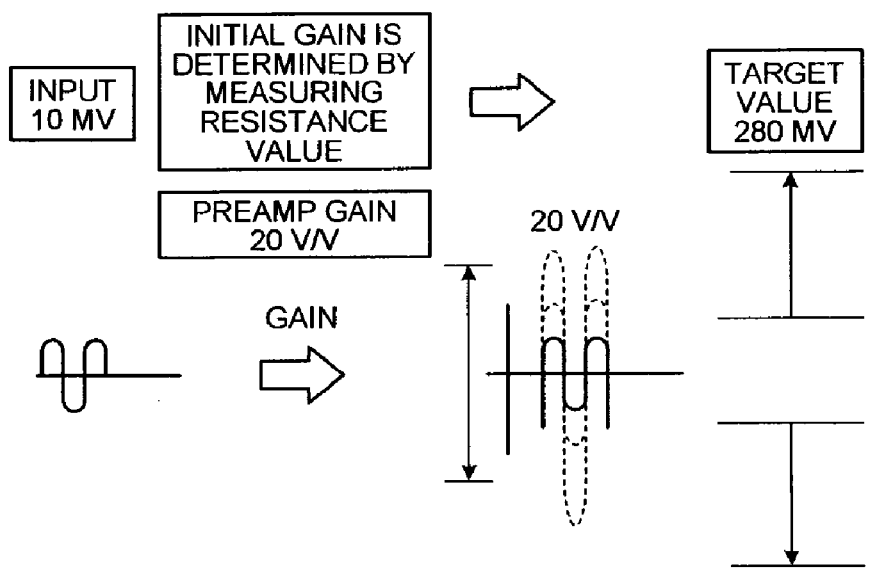
FIG. 10 shows an AGC operation when an initial value is set according to the present embodiment.

FIG. 6 is a flow chart depicting the AGC sequence processing which is executed by the MPU in FIG. 2, FIG. 7 is a flow chart depicting an initial AGC value calibration which is executed by the MPU in FIG. 2, FIG. 8 is a graph depicting the relationship of the measured resistance values in FIG. 6 and the output current, FIG. 9 shows an AGC operation when an initial value is not set, and FIG. 10 shows an AGC operation when an initial value is set according to the present embodiment.

The AGC processing based on resistance measurement will now be described according to FIG. 6, with reference to FIG. 8 to FIG. 10. FIG. 6 shows a measurement processing which is executed before shipping the device.

(S10) When the power is turned ON, the MPU 104b starts up the head amplifier. In other words, in FIG. 2, the head IC 103 receives a read signal from the read/write terminal, enables the first amplifiers 50-0 to 50-3, multiplexer 52, differential amplifier 12 and buffer amplifier 54, and forms a read path.

(S12) The MPU 104b starts the AGC gain setting sequence.

(S14) The MPU 104b sends a head number of the measurement target head (head selection signal) to the serial interface unit 32. By this, the head selection signal is sent to the multiplexer 52, and the multiplexer 52 selects an output of the head indicated by the head selection signal (that is, output of the first amplifier). The resistance measurement circuit 112 connects the head indicated by the head selection signal to the measurement circuit in FIG. 4.

(S16) The MPU 104b instructs the resistance measurement circuit 112 to start measurement via the serial interface unit 32. By this, as described in FIG. 4, the resistance measurement circuit 112 supplies the measurement current (or voltage) to the read element of the selected head. Then the MPU 104b obtains the terminal voltage difference Vm of the read element via the A/D converter 172, and stores it in the memory 134. The MPU 104b obtains the resistance value Rm of the read element by dividing the terminal voltage difference Vm by the measurement current Im. This resistance value Rm is stored in the memory 134.

(S18) The MPU 104b converts this measurement resistance value into the head output value, and calculates an initial gain value from the amplitude output which is required. When the measurement resistance value is converted into the head output amplitude, since the measured resistance value is measured by applying DC bias, the converted head output amplitude does not always match with the actual head output (AC) amplitude.

FIG. 8 is a graph depicting the relationship of the head resistance value, measured in the testing step in the factory, and the head output amplitude. The abscissa in FIG. 8 shows the head resistance value, and the ordinate shows the head output amplitude value. As FIG. 8 shows, the head resistance value and the output amplitude value are roughly in a proportional relationship, but when closely checked, the output amplitude values differ even if the resistance values are the same. For example, even if the head resistance value is 300 ohm, the output amplitude value is dispersed in a certain range, such as 10 to 16 mVp-p. Therefore the head resistance value does not directly correspond to the output amplitude value.

For this reason, from the measurement results in FIG. 8, an approximate expression AFM between the head resistance value x and the head output value y is created in advance. According to the measurement result in FIG. 8, the approximate expression is given by the following Expression (1).

$$y = 0.0676x - 6.7698 \quad (1)$$

The MPU 104b substitutes the measurement head resistance value x in Expression (1) to calculate the head output value y. By using such an appropriate expression, the head resistance value x can be converted into a head output value y with relative accuracy and at high-speed.

The MPU 104b also calculates the initial gain value G. In this case, the target value VT of the output of the AGC amplifier 12 is divided by the head output value y to calculate the initial gain value G. Then this initial gain value G is written to the memory 134.

(S20) Then the MPU 104b reads the calculated initial gain G stored in the memory 134, and outputs it to the read channel 102 and the serial interface unit 32, and sends a gain setting instruction to the AGC sequencer of the AGC circuit 14. By this, as described in FIG. 5, the initial gain value is set in the gain latch circuit 26 by the switch 24. Therefore the differential amplifier 12 amplifies signals with the gain of this initial gain value which is set.

(S22) The MPU 104b in MCU 104 then sends the AGC enable signal to the serial interface unit 32 of the head IC 103 via the read channel circuit 102. By this, the switch 24 is switched to the gain multiplier 19 side, as described in FIG. 5, and the differential signal converter 22, ADC 20 and comparison/gain decision circuits 15, 16, 18 and 19 are enabled.

By this, the gain error detection circuit 16 computes a difference between the amplitude, which is a difference between the minus side voltage and the plus side voltage of the differential amplifier 12 from the ADC 20, and the target value of the amplitude in the memory 15, and outputs the gain error value, and the feed controller 18 and the gain multiplexer 19 determine the amplification factor (gain) from the gain error value, and updates the gain of the gain latch circuit 26 via the switch 24.

This operation is performed for a predetermined gain adjustment time, and then AGC operation is stopped. The MPU 104b reads the AGC-adjusted gain value in the latch circuit 26 via the serial interface unit 32, and updates the gain value of the selected head in the memory 134 using the read value.

(S24) The MPU 104b judges whether measurement processing ended for all the heads. If not, processing returns to step S14, and measurement is performed for the next head. If measurement is ended for all the heads, the AGC adjustment of the head IC ends.

After this adjustment processing, the respective optimum gain values for all the installed heads are stored in the memory 134. This optimum gain value is written in the system area of the magnetic disk 117 as status information of the device. In the system area of the magnetic disk 117, the status information of the device (optimum gain/read current/voltage of each head, boost amount of write waveform, various setting parameters) is stored.

In the read operation after the device is shipped, the MCU 104 reads the data in the system area of the magnetic disk 117 via the head IC 103 and the read channel circuit 102, and stores the data in the memory 134, and then sets it in each unit. The MCU 104 also sets the read current/voltage of the TuMR element and the boost amount of the write waveform of the write element in the head IC 103 via the read channel circuit 102. By this, preparation for the read/write operation of data completes.

When data is read or written, the MCU 104 sends a head selection signal to the head IC 103 via the read channel circuit 102. By this, the multiplexer 52 of the head IC selects the instructed head. The MCU 104 also sends an initial gain value of the selected head to the serial interface (SIF) unit 32 of the head IC 103 via the read channel circuit 102. By this, the provided initial gain amount is set in the latch circuit 26 via the switch 24. In other words, the AGC amplifier 12 performs an amplification operation with the gain amount which is set. This means that the AGC amplifier 12 operates with a fixed gain. And data read is started with this gain.

When the head is changed, a head selection signal is sent to the head IC 103, and the multiplexer 52 selects the instructed head. And the MCU 104 sends the initial gain value of the selected head to the serial interface (SIF) unit 32 of the head IC 103 via the read channel circuit 102. By this, the provided initial gain amount is set in the latch circuit 26 via the switch 24. In other words, the AGC amplifier 12 performs an amplification operation with the gain amount which is set.

Therefore the initial gain can be adjusted using the AGC gain adjustment mode, and the amplitude can be adjusted to an amplitude which enters a dynamic range of the AGC circuit of the read channel circuit 102 at high-speed, even if dispersion of the characteristics of the heads is major.

When this initial adjustment value is stored in the memory, a corresponding initial gain can be read and set in the AGC amplifier 12 when a head is selected, whereby an optimum gain can be set without requiring an AGC operation. In other words, the AGC detection circuit 14 is not operated, which has a considerable effect to decrease power consumption. In the case of installing this head IC in portable equipment, of which supplied power is limited, this effect of decreasing the power consumption is major. In particular, the AGC execution time can be minimized, and as a result, general power consumption can be decreased, and read operation can be performed at an optimum gain even if heads disperse considerably.

Also according to this embodiment, the level is automatically adjusted in the head IC, so an extra signal line to the outside is not required. Hence, as described in FIG. 3, the head IC is suitable to be installed in the actuator.

Furthermore, as FIG. 7 shows, the preamplifier control unit 130 may determine an AGC measurement interval in advance according to the change of temperature, voltage, pressure or time in the environmental state measurement unit 114, so that the AGC adjustment in FIG. 6 is executed when the AGC interval is turned ON. In other words, the AGC interval is turned ON and the AGC adjustment in FIG. 6 is executed as a part of calibration if the temperature or voltage or pressure change amount is a predetermined quantity or more, or if a predetermined time has elapsed since the previous calibration.

FIG. 9 and FIG. 10 are diagrams depicting an effect of the present embodiment, where FIG. 9 depicts the AGC operation when an initial gain value is not set, and FIG. 10 depicts the AGC operation when an initial gain value is set.

In FIG. 9, the input signal from the head is 10 mV, and the gain of the AGC amplifier (preamp) 12 has 10 steps, x5 to x50, and if the target (target value) is 280 mV, the gain is sequentially changed as x5, x10, x15, x20, x25 and x30, and x25 is selected since the gain exceeds the target 280 mV at x30. The gain value is sequentially selected from the maximum or minimum, and an output matching this target is searched, so it takes time to select a gain.

In FIG. 10, on the other hand, an initial gain value is determined based on a resistance value, and the AGC is adjusted after setting this initial gain. If the resistance value is 210Ω, for example, the head output value is converted into 10 mV, and the initial gain value 280 mV/10 mV=multiple of 28 is obtained. In the above 10 steps of gain setting, the initial gain value is set to x25. So the AGC adjustment starts with x25 of gain, and then is changed to x30. Since the gain exceeds the target 280 mV at x30, x25 is selected. The time required for selecting a gain can be decreased considerably because the gain selection is started with the estimated gain value determined based on the resistance value.

The resistance measurement circuit of the head is provided to determine the bias current value for the head, or to detect the deterioration of the head by measuring the resistance, and these decisions and detections can be easily implemented by using the measurement results.

Other Embodiments

In the above mentioned embodiments the AGC circuit was described using the configuration in FIG. 5 and others, for example, but another AGC circuit, such as an analog type AGC circuit and an AGC circuit having a peak hold circuit and integration circuit, can also be used. Also an example of the read circuit of the head of the magnetic disk device was described, but the present invention can also be applied to a read circuit of other media storage devices.

Also the gain adjustment of the differential amplifier 12 may be performed when the power of the magnetic disk device is first turned ON after the device is shipped, where the measurement gain of each head (channel) is stored in the memory (or system area of the disk).

The gain of the differential amplifier 12 may be adjusted as a part of calibration at every predetermined time during operation of the magnetic disk device, or when an environment change, such as the temperature change, occurs, or when an error rate of the read signal is measured and the error rate exceeds a reference value, so that the gain in the memory (or system area of the disk) is updated using the measured gain of each head (channel).

The preferred embodiments described herein are therefore illustrative and not restrictive, the scope of the invention indicated by the embodiments and all variations with come within the meaning of the claims are intended to be embraced therein.

Since the AGC amplifier is disposed in the head IC, the amplitude from the head is automatically adjusted in the head IC, and the signal level, which enters the input dynamic range of the AGC amplifier of the read channel, can be adjusted. Also an estimated gain value converted from a result of measuring a resistance value of the head is used as an initial value for the adjustment of the AGC amplifier, so it becomes possible attempting to prevent an increase in the lock-in times of the AGC, to guarantee stability, and to prevent judgment errors of the AGC.

What is claimed is:

1. An amplifier gain adjustment method for a head IC for adjusting an amplitude level of a read signal from a head that reads information on a medium, said method comprising:
   measuring a resistance value of the head;
   estimating an output current of the head from the resistance value;
   calculating an estimated gain value of an AGC amplifier of the head IC constituted by a differential amplifier and an AGC circuit from a target output value of the AGC amplifier and the output current value;
   setting the estimated gain value in the AGC amplifier; and
   operating the AGC circuit after the estimated gain value is set.

2. The amplifier gain adjustment method for a head IC according to claim 1, further comprises:
   reading a gain value obtained by operating the AGC circuit and storing the value in a memory; and
   setting the gain value of the memory in the AGC amplifier when read operation of the head is started.

3. The amplifier gain adjustment method for a head IC according to claim 1, wherein the estimating the output current further comprises converting the resistance value into the output value using an approximate expression of relationship of the resistance value and the output value.

4. The amplifier gain adjustment method for a head IC according to claim 1, wherein the measuring the resistance value further comprises:
   measuring the resistance value for each of a plurality of the heads connected to the head IC;
   converting the estimated gain value;
   setting the estimated gain value; and
   operating the AGC circuit.

* * * * *

UNITED STATES PATENT AND TRADEMARK OFFICE
CERTIFICATE OF CORRECTION

| | | |
|---|---|---|
| PATENT NO. | : 7,843,659 B2 | Page 1 of 1 |
| APPLICATION NO. | : 12/199244 | |
| DATED | : November 30, 2010 | |
| INVENTOR(S) | : Yamasaki | |

It is certified that error appears in the above-identified patent and that said Letters Patent is hereby corrected as shown below:

On the Face of the Patent:

(57)  ABSTRACT

Delete the Abstract on the face of the patent and insert the following in its place:

--An amplifier gain adjustment method for a head IC adjusts an amplitude level of a read signal from a head that reads information on a medium. The method includes steps of measuring a resistance value of the head and estimating an output current of the head from the resistance value. An estimated gain value of an AGC amplifier of the head IC constituted by a differential amplifier and an AGC circuit is calculated from a target output value of the AGC amplifier and the output current value. The estimated gain value is set in the AGC amplifier, and the AGC circuit is operated after the estimated gain value is set.--

Signed and Sealed this
Twenty-second Day of February, 2011

David J. Kappos
*Director of the United States Patent and Trademark Office*